(No Model.)

C. R. & J. C. WILSON.
COUPLING FOR VEHICLE SPRINGS.

No. 307,614. Patented Nov. 4, 1884.

WITNESSES
Jno. E. Wiles.
N. S. Wright.

INVENTOR
Charles R. Wilson
Joseph C. Wilson
By W. W. Leggett
Attorney

United States Patent Office.

CHARLES R. WILSON AND JOSEPH C. WILSON, OF DETROIT, MICHIGAN.

COUPLING FOR VEHICLE-SPRINGS.

SPECIFICATION forming part of Letters Patent No. 307,614, dated November 4, 1884.

Application filed June 30, 1884. (No model.)

*To all whom it may concern:*

Be it known that we, CHARLES R. WILSON and JOSEPH C. WILSON, of Detroit, county of Wayne, State of Michigan, have invented a new and useful Improvement in Couplings for Side-Bar Springs; and we declare the following to be a full, clear, and exact description of the invention, such as will enable others skilled in the art to which it pertains to make and use it, reference being had to the accompanying drawings, which form a part of this specification.

Our invention consists in the combination of devices and appliances hereinafter specified, and more particularly pointed out in the claims.

Figure 1:
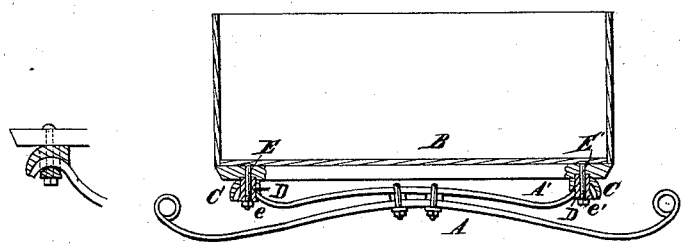
Figure 2:
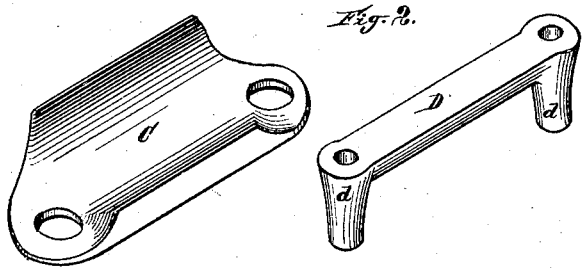
Figure 3:
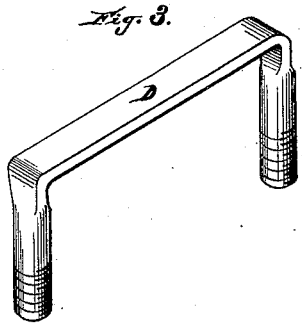
Figure 4:
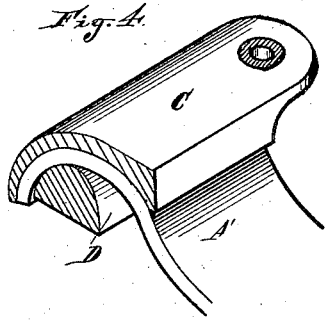

In the drawings, Figure 1 is a vertical section of a device embodying our invention. Fig. 2 represents separate views of some of the parts. Fig. 3 is an additional view. Fig. 4 is a perspective.

The object of our invention is to provide an improved coupling for attaching springs to a buggy-body, whereby all liability of rattling is effectually prevented.

It is well known that it is very desirable among carriage manufacturers and users to prevent all liability to noise, and that as springs have heretofore been coupled this liability to rattle has existed more or less, especially after the shackling has become somewhat worn. It is the purpose of our improved device to effectually overcome this undesirable feature, and to enable us to effectually tighten the coupling, so as to prevent rattling whenever the coupling may become worn to any degree.

We carry out our invention as follows:

In the drawings, A and A' represent springs similar to those patented to us December 19, 1882, No. 269,493.

B is the buggy-body.

C represents our improved bed-plate, which may be made of any suitable material, provided with bolt-holes. Said bed-plate is preferably curved on its under side, as shown, to conform to the curved end of the spring, though we prefer to construct the curve of the bed-plate upon a somewhat larger arc than that of the curve on the end of the spring, the construction being such that the end of the spring will have a limited bearing upon the bed-plate.

D is our improved yoke. This yoke may be of any suitable form. It may either be provided with extended sleeves $d$, to receive the bolts, or it may consist simply of a perforated bar to receive the bolt, adapted to clamp the end of the spring upon the bed-plate, or it may consist simply of an ordinary clip clamped upon the bed-plate by nuts at the top inside the buggy-box.

E and E' represent bolts inserted through the sills of the buggy-body, the bed-plate, and the yoke, and by which the yoke is tightened upon the bed-plate by means of nuts $e$ and $e'$.

It is evident that should any of the parts become worn, so that there is liability of rattling, the same may be corrected readily by simply tightening the nuts upon the bolts.

We prefer to use the yoke and bolts rather than the clip, as this construction enables us to dispense with the nuts inside the box and locate them at the base. We do not, however, limit ourselves to either construction.

What we claim is—

1. A coupling for attaching springs to vehicle-bodies, consisting of the curved bed-plate to rest on the spring, and provided with bolt-holes at its ends, and a yoke connected with the body and with the end bolt-holes, to secure the bed-plate to the body and to the spring, said bed-plate being adapted to rest between the body and the spring, substantially as described.

2. The combination of the vehicle-body, the spring, the curved bed-plates resting on the springs and provided with end bolt-holes, the yokes D, and bolts passing through the sills of the body, the bolt-holes of the bed-plates, and the yokes for adjustably connecting the parts, said bed-plates being interposed between the sills of the body and the springs, substantially as described.

In testimony whereof we sign this specification in the presence of two witnesses.

CHARLES R. WILSON.
JOSEPH C. WILSON.

Witnesses:
N. S. WRIGHT,
M. B. O'DOGHERTY.